United States Patent
Zhang (10) Patent No.: US 10,182,007 B2
(45) Date of Patent: Jan. 15, 2019

(54) APPARATUS, SYSTEM, AND METHOD FOR FACILITATING CONTROLLER-BASED MULTICAST SIGNALING

(71) Applicant: Juniper Networks, Inc., Sunnyvale, CA (US)

(72) Inventor: Zhaohui Zhang, Westford, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 15/473,945

(22) Filed: Mar. 30, 2017

(65) Prior Publication Data
US 2018/0287936 A1    Oct. 4, 2018

(51) Int. Cl.
| | |
|---|---|
| *H04L 12/723* | (2013.01) |
| *H04L 12/18* | (2006.01) |
| *H04L 12/741* | (2013.01) |
| *H04L 12/66* | (2006.01) |

(52) U.S. Cl.
CPC ............ *H04L 45/507* (2013.01); *H04L 12/18* (2013.01); *H04L 12/66* (2013.01); *H04L 45/745* (2013.01)

(58) Field of Classification Search
CPC ....... H04L 45/507; H04L 12/66; H04L 12/18; H04L 45/745; H04L 12/56
See application file for complete search history.

(56) References Cited

U.S. PATENT DOCUMENTS

| | | | | |
|---|---|---|---|---|
| 2008/0298360 A1* | 12/2008 | Wijnands | ............... | H04L 12/18 370/389 |
| 2014/0098815 A1* | 4/2014 | Mishra | .................. | H04L 45/021 370/390 |

OTHER PUBLICATIONS

Z. Zhang, et al.; BGP Based Multicast; https://tools.ietf.org/html/draft-zzhang-bess-bgp-multicast-01, Mar. 30, 2010.

* cited by examiner

*Primary Examiner* — Anez C Ebrahim
(74) *Attorney, Agent, or Firm* — FisherBroyles, LLP (57) ABSTRACT

The disclosed computer-implemented method may include (1) receiving, at an upstream router of a multicast distribution tree, a packet that is destined for a receiver within an MPLS network, (2) identifying within the packet (A) a context label that specifies a controller and (B) a tree label that is assigned by the controller, (3) identifying a forwarding table that corresponds to the context label identified within the packet, (4) searching the forwarding table that corresponds to the context label for the tree label that specifies the multicast distribution tree, (5) identifying, based at least in part on the search, a downstream router of the multicast distribution tree that is to receive the packet on the way to the receiver, and then (6) forwarding the packet to the downstream router of the multicast distribution tree on the way to the receiver. Various other methods, systems, and apparatuses are also disclosed.

20 Claims, 7 Drawing Sheets

000
APPARATUS, SYSTEM, AND METHOD FOR FACILITATING CONTROLLER-BASED MULTICAST SIGNALING

BACKGROUND

MultiProtocol Label Switching (MPLS) networks often include various paths that facilitate the flow of traffic from a source to a receiver. In such MPLS networks, these paths may be identified and/or represented by labels that correspond to portions of the paths. For example, a packet may traverse an MPLS network from a source device to a receiver device. In multicast configurations, the source device may send the same traffic to multiple receiver devices. To facilitate such multicast traffic, some MPLS networks may include a centralized controller that distributes labels to the various nodes within the paths by way of control-plane signaling. These MPLS networks may perform control-plane signaling with Protocol Independent Multicast (PIM) and/or Multicast Label Distribution Protocol (MLDP). However, in addition to PIM and MLDP, these MPLS networks may also implement Border Gateway Protocol (BGP).

Unfortunately, the implementation of these various protocols may increase the complexity or difficulty of network creation and/or maintenance. As a result, it may be desirable to simply run and/or implement a single protocol (such as BGP) for all control-plane signaling. The instant disclosure, therefore, identifies and addresses a need for improved apparatuses, systems, and methods for facilitating controller-based multicast signaling within MPLS networks.

SUMMARY

As will be described in greater detail below, the instant disclosure generally relates to apparatuses, systems, and methods for facilitating controller-based multicast signaling. In one example, a computer-implemented method for facilitating controller-based multicast signaling may include (1) receiving, at an upstream router of a multicast distribution tree, a packet that is destined for a receiver within an MPLS network, (2) identifying within the packet (A) a context label that specifies a controller responsible for assigning tree labels to multicast distribution trees and (B) a tree label that specifies the multicast distribution tree and is assigned by the controller to the multicast distribution tree, (3) identifying, at the upstream router, a forwarding table that corresponds to the context label identified within the packet, (4) searching the forwarding table that corresponds to the context label for the tree label that specifies the multicast distribution tree, (5) identifying, based at least in part on the search of the forwarding table, a downstream router of the multicast distribution tree that is to receive the packet on the way to the receiver within the MPLS network, and then (6) forwarding the packet to the downstream router of the multicast distribution tree on the way to the receiver.

As another example, a system for implementing the above-described method may include various modules stored in memory. The system may also include at least one physical processor that executes these modules. For example, the system may include (1) a receiving module that receives, at an upstream router of a multicast distribution tree, a multicast packet within an MPLS network, (2) an identification module that (A) identifies within the packet (I) a context label that specifies a controller responsible for assigning tree labels to multicast distribution trees and (II) a tree label that specifies the multicast distribution tree and is assigned by the controller to the multicast distribution tree and (B) identifies a forwarding table that corresponds to the context label identified within the packet, (C) searches the forwarding table that corresponds to the context label for the tree label that specifies the multicast distribution tree, and (D) identifies, based at least in part on the search of the forwarding table, a downstream router of the multicast distribution tree that is to receive the packet on the way to the receiver within the MPLS network, and (3) a forwarding module that forwards the packet to the downstream router of the multicast distribution tree on the way to the receiver.

As a further example, an apparatus for implementing the above-described method may include (1) at least one storage device that stores at least one forwarding table that includes a plurality of tree labels assigned to multicast distribution trees within an MPLS network and (2) at least one physical processing device that is communicatively coupled to the storage device at an upstream router of a multicast distribution tree, wherein the physical processing device (A) receives a packet that is destined for a receiver within the MPLS network, (B) identifies within the packet (I) a context label that specifies a controller responsible for assigning tree labels to multicast distribution trees and (II) a tree label that specifies the multicast distribution tree, (C) identifies a forwarding table that corresponds to the context label identified within the packet, (D) searches the forwarding table that corresponds to the context label for the tree label that specifies the multicast distribution tree, (E) identifies, based at least in part on the search of the forwarding table, a downstream router of the multicast distribution tree that is to receive the packet on the way to the receiver within the MPLS network, and then (F) forwards the packet to the downstream router of the multicast distribution tree on the way to the receiver.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for facilitating controller-based multicast signaling. The term "multicast signaling," as used herein, generally refers to any process and/or procedure for programming and/or configuring the control plane of a network. In one example, a controller may program and/or configure the control plane of a network by distributing MPLS labels to various routers within the network via BGP signaling.

As will be explained in greater detail below, routers within an MPLS network may each maintain a plurality of forwarding tables that include tree labels assigned to multicast distribution trees. Each of these forwarding tables may be specific and/or correspond to the device that assigned the labels included in that forwarding table. For example, one forwarding table may correspond to a first controller and include only labels assigned by that first controller. In this example, another forwarding table may correspond to a second controller and include tree labels assigned by that second controller.

Continuing with this example, each of these forwarding tables may be identified by a context label that specifies and/or corresponds to the device that assigned the labels included in that forwarding table. Accordingly, packets that traverse a multicast distribution tree within the MPLS network may include both a context label that identifies the controller responsible for assigning labels included in the corresponding forwarding table and a tree label that identifies the multicast distribution tree. Upon receiving a packet within the MPLS network, a router may identify a context label and a tree label within the packet. The router may also search a forwarding table that corresponds to the context label for the tree label and identify the packet's next hop based at least in part on that search. The router may then forward the packet to the next hop on the way to its final destination.

The controller(s) and/or routers within the MPLS network may establish and/or configure the multicast distribution trees by way of BGP signaling. As a result, these controller(s) and/or routers may eliminate the need to implement and/or perform control-plane signaling using PIM and/or MLDP. In doing so, these controller(s) and/or routers may essentially consolidate the protocols used in network creation and/or maintenance to just BGP, thereby simplifying the network's control plane.

The following will provide, with reference to FIGS. 1-3 and 6, detailed descriptions of exemplary systems for facilitating controller-based multicast signaling. Detailed descriptions of corresponding computer-implemented methods will be provided in connection with FIG. 4. Detailed descriptions of exemplary packets traversing multicast distribution trees within a network will be provided in connection with FIG. 5. In addition, detailed descriptions of an exemplary computing system for carrying out these methods will be provided in connection with FIG. 7.

Figure 1:
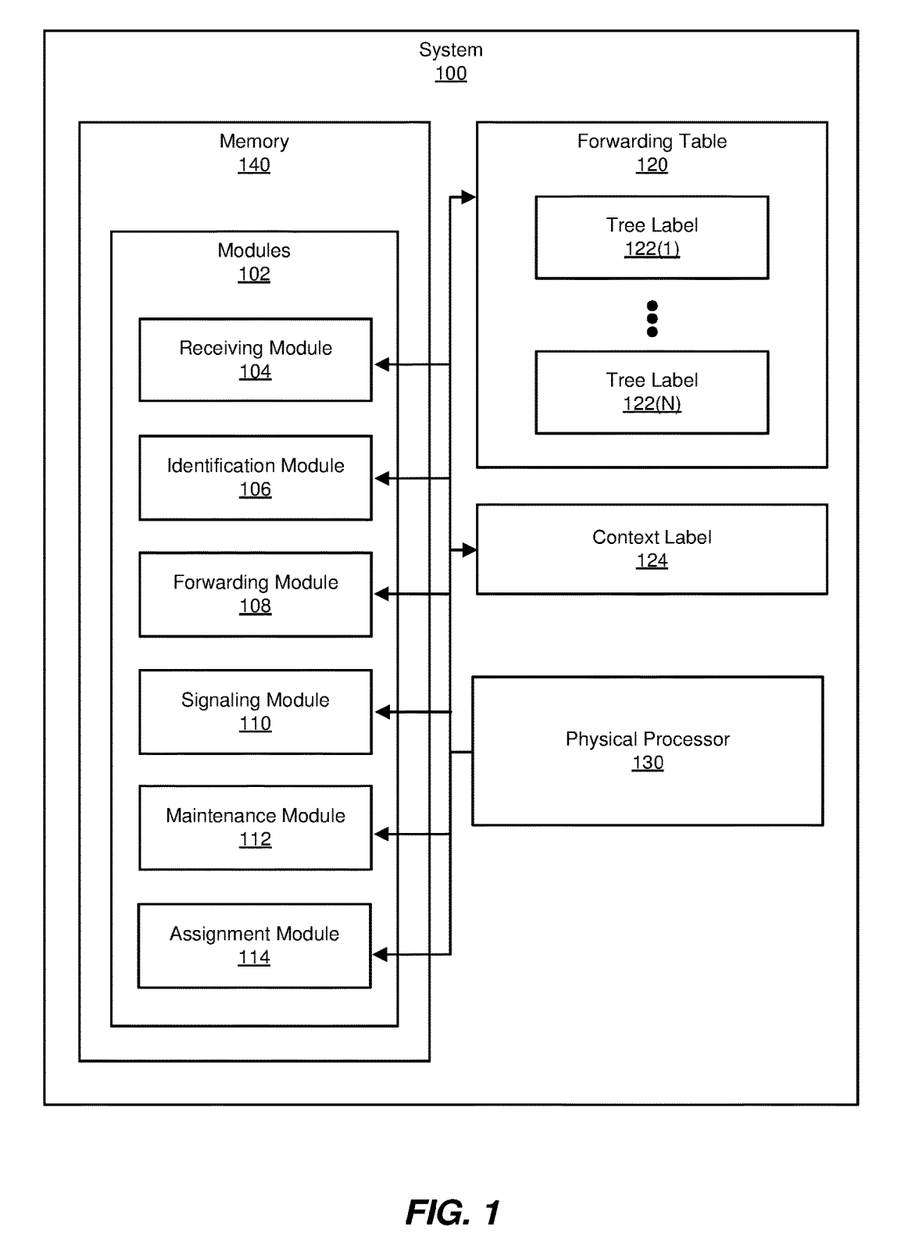
FIG. 1 is a block diagram of an exemplary system for facilitating controller-based multicast signaling.

FIG. 1 is a block diagram of an exemplary system 100 for facilitating controller-based multicast signaling. As illustrated in this figure, exemplary system 100 may include one or more modules 102 for performing one or more tasks. As will be explained in greater detail below, modules 102 may include a receiving module 104, an identification module 106, a forwarding module 108, a signaling module 110, a maintenance module 112, and an assignment module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., upstream router 202, controller 206, and/or downstream router 208) or the devices illustrated in FIG. 3 (e.g., source 302, router 304, and/or receivers 306(1)-(4)). One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate controller-based multicast signaling. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more forwarding tables, such as forwarding table 120. In some examples, forwarding table 120 may include tree labels 122(1)-(N) assigned to different multicast distribution trees within an MPLS network. In these examples, the tree labels may facilitate the flow of traffic from one router to another along the different multicast distribution trees within the MPLS network. Forwarding table 120 may be specific and/or correspond to a particular controller and/or include only labels assigned by that particular controller. In some examples, forwarding table 120 may include forwarding information, prefixes, Internet Protocol (IP) addresses, and/or Media Access Control (MAC) addresses of routers within the multicast distribution trees.

As illustrated in FIG. 1, exemplary system 100 may also include one or more context labels, such as context label 124. In some examples, context label 124 may correspond to and/or represent a controller responsible for assigning tree labels to multicast distribution trees within an MPLS network. In one example, each router within a multicast tree may assign a different context label to the same controller. In this example, those context labels may be distributed to the controller itself and/or the respective upstream routers within the multicast distribution tree.

As one example, a downstream router may assign context label 124 to a controller and then send context label 124 to the controller via BGP signaling. The controller may in turn send context label 124 to the router directly upstream from the downstream router within the multicast distribution tree via BGP signaling. Context label 124 may be used by the upstream router to identify which forwarding table to search for information that specifies the downstream router of the multicast distribution tree.

Continuing with this example, the upstream router may assign a different context label to the controller and then send that context label to the controller via BGP signaling. The controller may in turn send that context label to the router further upstream from the upstream router within the multicast distribution tree via BGP signaling. That context label may be used by the further upstream router to identify which forwarding table to search for information that specifies the upstream router of the multicast distribution tree.

Figure 2:
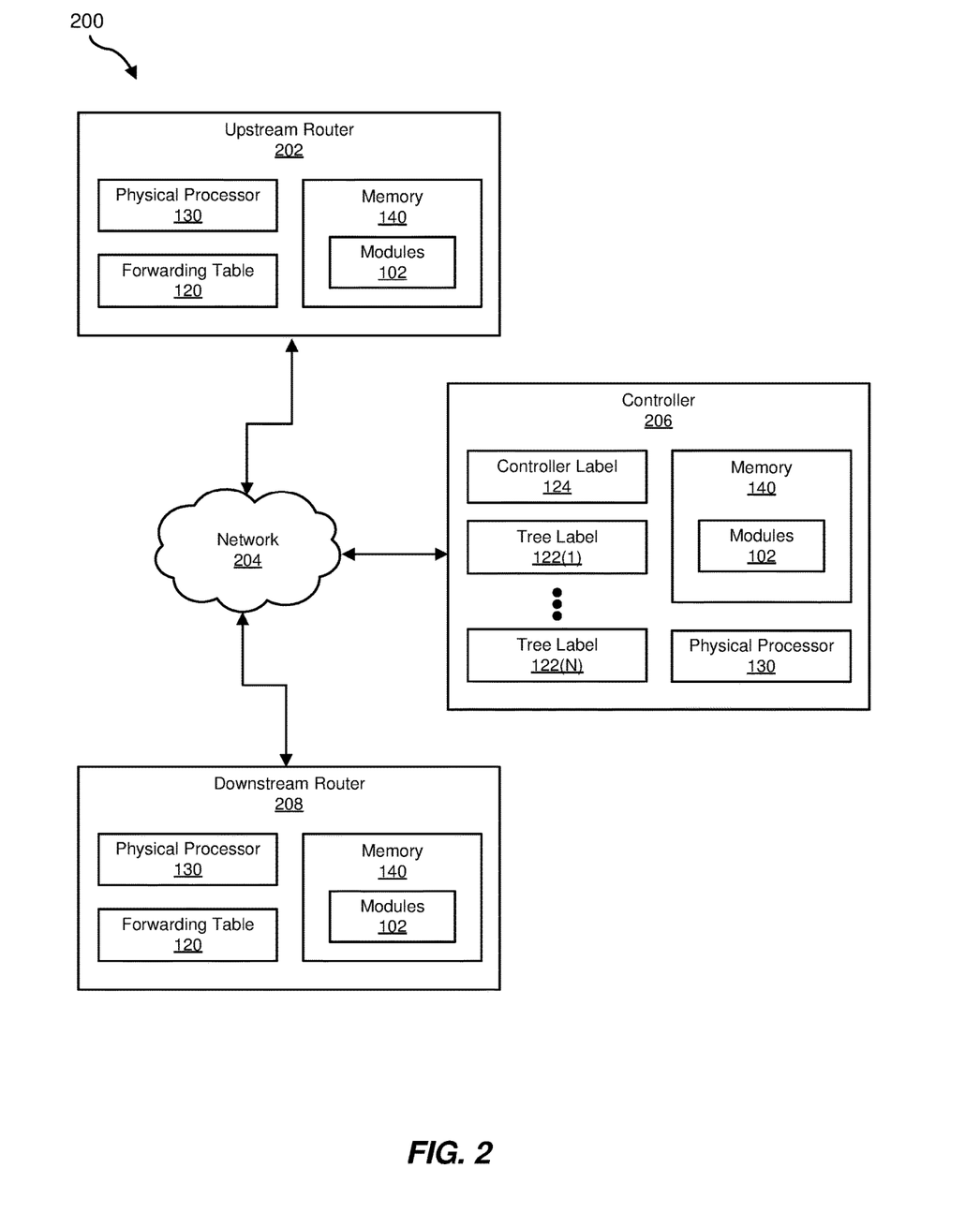
FIG. 2 is a block diagram of an additional exemplary system for facilitating controller-based multicast signaling.

Exemplary system 100 in FIG. 1 may be implemented in a variety of ways. For example, all or a portion of exemplary system 100 may represent portions of exemplary system 200 in FIG. 2. As shown in FIG. 2, system 200 may include an upstream router 202, a downstream router 208, a controller 206, and a network 204. In one example, all or a portion of the functionality of modules 102 may be performed by upstream router 202, downstream router 208, controller 206, and/or any other suitable computing system. As will be described in greater detail below, one or more of modules 102 from FIG. 1 may, when executed by at least one processor of upstream router 202, downstream router 208, and/or controller 206, enable upstream router 202, downstream router 208, and/or controller 206 to facilitate controller-based multicast signaling within an MPLS network.

Upstream router 202 and downstream router 208 each generally represent any type or form of physical computing device that forwards traffic within a network. Examples of upstream router 202 and downstream router 208 include, without limitation, Customer Edge (CE) routers, Provider Edge (PE) routers, hub routers, spoke routers, autonomous system boundary routers, area border routers, portions of one or more of the same, combinations or variations of one or more of the same, and/or any other suitable routers. Although FIG. 2 illustrates only a single upstream router and a single downstream router, other embodiments may involve and/or incorporate multiple upstream routers and/or multiple downstream routers.

The term "upstream," as used herein, generally refers to a router that resides more toward the source of a multicast distribution tree and/or the ingress of a Label-Switched Path (LSP) than a downstream router. In contrast, the term "downstream," as used herein, generally refers to a router that resides more toward the receiver of a multicast distribution tree and/or the egress of an LSP than an upstream router. The term "egress," as used herein, generally refers to any physical computing device that represents the final hop and/or destination of an LSP. The term "ingress," as used herein, generally refers to any physical computing device that represents the source at which an LSP begins and/or originates.

Network 204 generally represents any medium or architecture capable of facilitating communication or data transfer. In one example, network 204 may facilitate communication among upstream router 202, downstream router 208, and/or controller 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, portions of one or more of the same, variations or combinations of one or more of the same, and/or any other suitable network. Although illustrated as being external to network 204 in FIG. 2, upstream router 202, downstream router 208, and/or controller 206 may each represent a portion of network 204 and/or be included in network 204.

Controller 206 generally represents any type or form of physical computing device capable of configuring multicast distribution trees within an MPLS network and/or assigning labels to such multicast distribution trees. In one example, controller 206 may be incorporated into an MPLS network as a centralized device that assigns and/or distributes labels to routers within the MPLS network. Although FIG. 2 illustrates only a single controller, other embodiments may involve and/or incorporate multiple controllers that assign and/or distribute labels to routers within the MPLS network whether independently of one another and/or in collaboration with one another.

Figure 3:
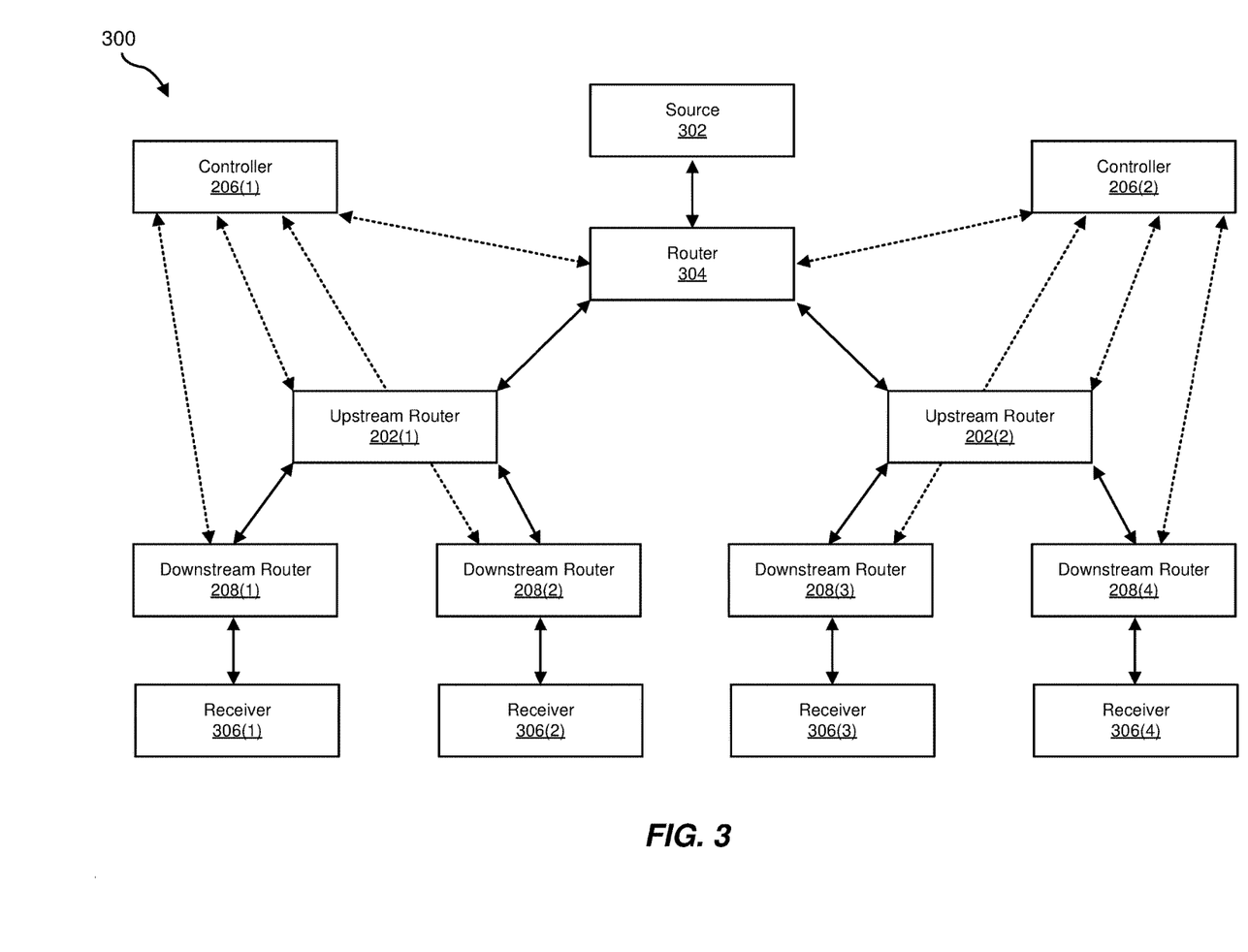
FIG. 3 is a block diagram of an additional exemplary system for facilitating controller-based multicast signaling.

As another example, all or a portion of exemplary system 100 may represent portions of exemplary system 300 in FIG. 3. As shown in FIG. 3, system 300 may include a source 302 capable of sending multicast traffic to receivers 306(1), 306(2), 306(3), and 306(4) by way of a router 304, upstream routers 202(1) and 202(2), and downstream routers 208(1), 208(2), 208(3), and 208(4). In this example, system 300 may also include controllers 206(1) and 206(2) that are responsible for configuring multicast distribution trees and/or assigning tree labels to the multicast distribution trees. Although FIG. 3 illustrates a specific embodiment that includes and/or involves multiple controllers, other embodiments of similar network topologies may include and/or involve only a single controller. Similarly, although FIG. 3 illustrates router 304, upstream routers 202(1) and 202(2), and downstream routers 208(1)-(4), system 300 may also include and/or represent various other routers that are not necessarily shown in FIG. 3.

Source 302 generally represents any type or form of physical computing device capable of reading computer-executable instructions and/or sourcing multicast traffic. In one example, source 302 may include and/or represent a client device. Examples of source 302 include, without limitation, laptops, tablets, desktops, servers, cellular phones, Personal Digital Assistants (PDAs), multimedia players, embedded systems, wearable devices (e.g., smart watches, smart glasses, etc.), gaming consoles, network devices, variations or combinations of one or more of the same, and/or any other suitable source.

Receivers 306(1)-(4) each generally represent any type or form of physical computing device capable of reading computer-executable instructions and/or receiving multicast traffic. In one example, receivers 306(1)-(4) may each include and/or represent a client device. Examples of receivers 306(1)-(4) include, without limitation, laptops, tablets, desktops, servers, cellular phones, PDAs, multimedia players, embedded systems, wearable devices (e.g., smart watches, smart glasses, etc.), gaming consoles, network devices, variations or combinations of one or more of the same, and/or any other suitable receivers.

Figure 4:
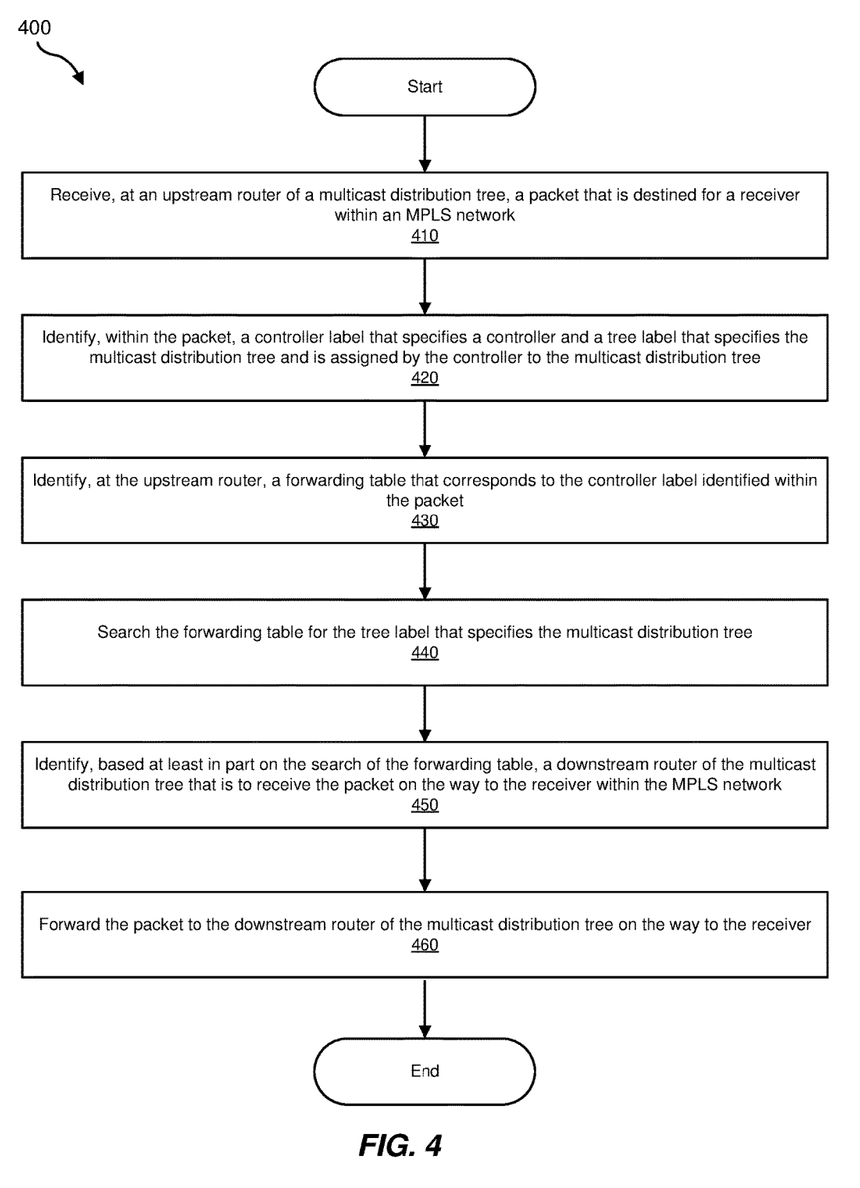
FIG. 4 is a flow diagram of an exemplary method for facilitating controller-based multicast signaling.

FIG. 4 is a flow diagram of an example computer-implemented method 400 for facilitating controller-based multicast signaling. The steps shown in FIG. 4 may be performed by any suitable computer-executable code and/or computing system, including system 100 in FIG. 1, system 200 in FIG. 2, system 300 in FIG. 3, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 410 one or more of the systems described herein may receive, at an upstream router of a multicast distribution tree, a packet that is destined for a receiver within an MPLS network. For example, receiving module 104 may, as part of upstream router 202(1) in FIG. 3, receive a packet that is destined for receiver 306(1) in FIG. 3. In this example, since the packet is multicast traffic, the packet may also be destined for receiver 306(2) in FIG. 3. Accordingly, upstream router 202(1) may make a copy of the packet and then forward one instance of the packet to downstream router 208(1) in FIG. 3 and another instance of the packet to downstream router 208(2) in FIG. 3.

The systems described herein may perform step 410 in a variety of different ways and/or contexts. In some examples, receiving module 104 may detect and/or identify a packet that arrives at upstream router 202(1) from router 304(1) in FIG. 3. In one example, source 302 may send a multicast packet that is destined for each of receivers 306(1)-(4) in FIG. 3 to router 304. Upon receiving the packet, router 304 may make a copy of the packet and then forward one instance of the packet to upstream router 202(1) and another instance of the packet to upstream router 202(2). As the packet reaches upstream router 202(1), receiving module 104 may receive the packet.

Returning to FIG. 4, at step 420 one or more of the systems described herein may identify a context label and a tree label within the packet. For example, identification module 106 may, as part of upstream router 202(1) in FIG. 3, identify a context label and a tree label within the packet. In this example, the context label may identify and/or specify controller 206(1) as being responsible for assigning tree labels to the multicast distribution tree of the packet. In other words, the context label may represent and/or correspond to controller 206(1) with respect to the forwarding tables within upstream router 202(1).

Additionally or alternatively, the tree label may identify and/or specify the multicast distribution tree being traversed by the packet within the MPLS network. In other words, the tree label may represent and/or correspond to the multicast distribution tree being traversed by the packet within the MPLS network. In this example, controller 206(1) may have assigned this tree label to the multicast distribution tree.

The systems described herein may perform step 420 in a variety of different ways and/or contexts. In some examples, identification module 106 may search the packet for a context label and/or a tree label. For example, identification module 106 may search the header of the packet for a context label and/or a tree label. During this search, identification module 106 may identify a context label that specifies controller 206(1) as being responsible for and/or managing the multicast distribution tree of the packet. Additionally or alternatively, identification module 106 may identify a tree label that specifies the multicast distribution tree of the packet relative to the forwarding table that corresponds to controller 206(1) at upstream router 202(1).

Figure 5:
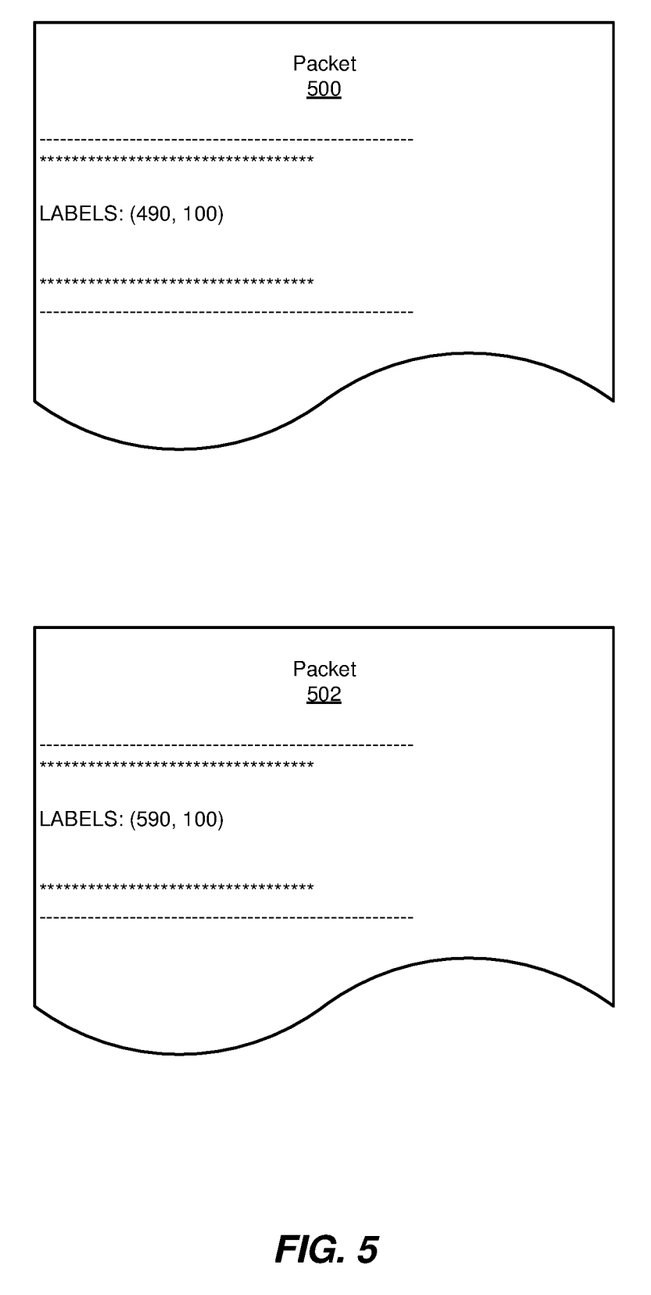
FIG. 5 is an illustration of exemplary packets traversing multicast distribution trees within a network.

As a specific example, router 304 may forward packet 500 in FIG. 5 to upstream router 202(1). As upstream router 202(1) receives packet 500, identification module 106 may search the header of packet 500 for any labels that indicate how to forward packet 500 toward its destination. During this search, identification module 106 may identify labels "(490, 100)" within packet 500. In this example, label "490" may represent the context label that corresponds to controller 206(1), and label "100" may represent the tree label that corresponds to the multicast distribution tree being traversed by packet 500.

As another example, router 304 may forward packet 502 in FIG. 5 to upstream router 202(1). As upstream router 202(1) receives packet 502, identification module 106 may search the header of packet 502 for any labels that indicate how to forward packet 502 toward its destination. During this search, identification module 106 may identify labels "(590, 100)" within packet 502. In this example, label "590" may represent the context label that corresponds to controller 206(1), and label "100" may represent the tree label that corresponds to the multicast distribution tree being traversed by packet 502.

However, since packets 500 and 502 have different context labels, their tree labels "100" may represent and/or correspond to different multicast distribution trees. For example, the context label of each packet may indicate which forwarding table to search for the corresponding multicast distribution tree. Accordingly, tree label "100" may identify and/or represent one multicast distribution tree in the forwarding table that corresponds to controller 206(1), but tree label "100" may identify and/or represent a different multicast distribution tree in the forwarding table that corresponds to controller 206(2).

Returning to FIG. 4, at step 430 one or more of the systems described herein may identify, at the upstream router, a forwarding table that corresponds to the context label identified within the packet. For example, identification module 106 may, as part of upstream router 202(1) in FIG. 3, identify forwarding table 120 as corresponding to controller 206(1). In one example, upstream router 202(1) may include and/or maintain at least one other forwarding table that corresponds to another device besides controller 206(1). In other words, this other forwarding table may be specific to the other device and/or include only labels assigned by the other device.

In one example, this other device to which the other forwarding table corresponds may include and/or represent controller 206(2) in FIG. 3. Additionally or alternatively, this other device to which the other forwarding table corresponds may include and/or represent upstream router 202(1). Accordingly, upstream router 202(1) may allocate and/or assign tree labels to be programmed and/or installed into its own forwarding table. In other words, upstream router 202(1) may create a forwarding table that is specific to upstream router 202(1) itself and/or includes only labels allocated and/or assigned by upstream router 202(1) itself.

The systems described herein may perform step 430 in a variety of different ways and/or contexts. In some examples, identification module 106 may compare the context label identified within the packet with the context label to which forwarding table 120 corresponds. Identification module 106 may then determine that the context label identified within the packet matches the context label to which forwarding table 120 corresponds. As a result, identification module 106 may determine that forwarding table 120 is the one that includes the labels assigned by controller 206(1). Additionally or alternatively, identification module 106 may determine that forwarding table 120 is the one that includes the forwarding information that indicates how and/or where to forward the packet from upstream router 202(1).

Figure 6:
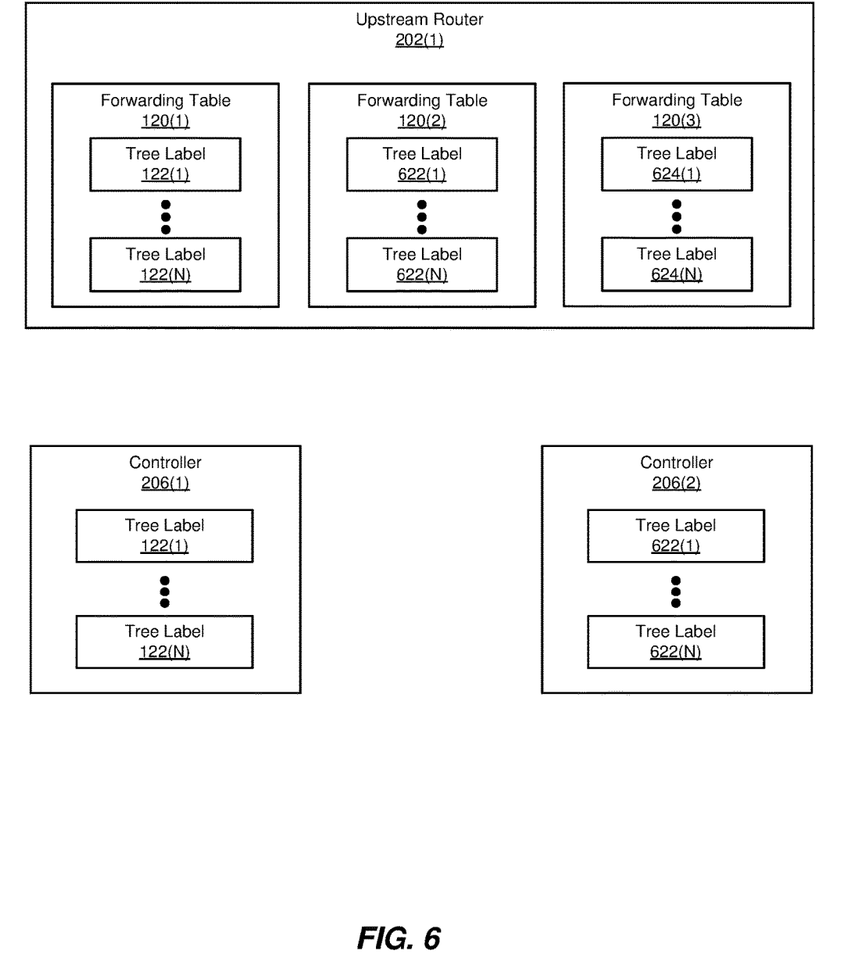
FIG. 6 is a block diagram of an additional exemplary system for facilitating controller-based multicast signaling.

As a specific example, identification module 106 may identify forwarding table 120(1) in FIG. 6 as corresponding to context label "490" in packet 500 in FIG. 5. As illustrated in FIG. 6, forwarding table 120(1) may include and/or maintain tree labels 122(1)-(N). In this example, tree labels 122(1)-(N) may have been allocated and/or assigned to multicast distribution trees within the MPLS network by controller 206(1).

As another example, identification module 106 may also identify forwarding table 120(2) in FIG. 6 as corresponding to context label "590" in packet 502 in FIG. 5. As illustrated in FIG. 6, forwarding table 120(2) may include and/or maintain tree labels 622(1)-(N). In this example, tree labels 622(1)-(N) may have been allocated and/or assigned to multicast distribution trees within the MPLS network by controller 206(2).

Similarly, identification module 106 may identify forwarding table 120(3) in FIG. 6 as corresponding to context label "690" in an additional packet (not illustrated in FIG. 5). As illustrated in FIG. 6, forwarding table 120(3) may include and/or maintain tree labels 624(1)-(N). In this example, tree labels 624(1)-(N) may have been allocated and/or assigned to multicast distribution trees within the MPLS network by upstream router 202(1) itself.

Returning to FIG. 4, at step 440 one or more of the systems described herein may search the forwarding table that corresponds to the context label for the tree label that specifies the multicast distribution tree. For example, identification module 106 may, as part of upstream router 202(1) in FIG. 3, search forwarding table 120 for the tree label that specifies and/or corresponds to the multicast distribution tree being traversed by the packet. This tree label may have been allocated and/or assigned to that multicast distribution tree by controller 206(1).

The systems described herein may perform step 440 in a variety of different ways and/or contexts. In some examples, identification module 106 may perform a label lookup on forwarding table 120 based at least in part on the tree label included in the packet. For example, identification module 106 may search forwarding table 120 for an entry that is identified by that tree label. In this example, the entry may include and/or provide forwarding information that indicates how and/or where to forward the packet such that the packet is able to reach its final destination along the multicast distribution tree.

As a specific example, identification module 106 may search forwarding table 120(1) in FIG. 6 for an entry that corresponds to tree label "100" in connection with packet 500. In this example, tree label 122(N) may include and/or represent label "100" allocated and/or assigned by controller 206(1). Accordingly, during the search of forwarding table 120(1), identification module 106 may identify the entry for tree label 122(N) as matching tree label "100" included in the packet. This entry may include forwarding information that identifies downstream router 208(1) as being the next hop of the multicast distribution tree corresponding to packet 500.

As another example, identification module 106 may search forwarding table 120(2) in FIG. 6 for an entry that corresponds to tree label "100" in connection with packet 502. In this example, tree label 622(1) may include and/or represent label "100" allocated and/or assigned by controller 206(2). Accordingly, during the search of forwarding table 120(2), identification module 106 may identify the entry for tree label 622(1) as matching tree label "100" included in the packet. This entry may include forwarding information that identifies downstream router 208(2) as being the next hop of the multicast distribution tree corresponding to packet 502.

Returning to FIG. 4, at step 450 one or more of the systems described herein may identify, based at least in part on the search of the forwarding table, a downstream router of the multicast distribution tree that is to receive the packet on the way to the receiver within the MPLS network. For example, identification module 106 may, as part of upstream router 202(1) in FIG. 3, identify downstream router 208(1) as the next hop of the multicast distribution tree based at least in part on the search of the forwarding table. In other words, identification module 106 may determine that downstream router 208(1) is to receive the packet on the way to receiver 306(1) within the MPLS network.

Additionally or alternatively, identification module 106 may identify downstream router 208(2) as the next hop of another relevant multicast distribution tree based at least in part on the search of the forwarding table. In other words, identification module 106 may determine that downstream router 208(2) is also to receive an instance of the packet on the way to receiver 306(2) within the MPLS network.

The systems described herein may perform step 450 in a variety of different ways and/or contexts. In some examples, identification module 106 may locate the forwarding information for the packet in the entry corresponding to the packet's tree label within forwarding table 120. This forwarding information may indicate that upstream router 202(1) is to forward the packet to downstream router 208(1) on the way to receiver 306(1). Accordingly, identification module 106 may identify downstream router 208(1) as the next hop of the multicast distribution tree by analyzing the forwarding information at that entry of forwarding table 120.

As another example, identification module 106 may locate the forwarding information for packet 500 in the entry corresponding to tree label 122(N) within forwarding table 120(1) in FIG. 6. This forwarding information may indicate that upstream router 202(1) is to forward packet 500 to downstream router 208(1). Accordingly, identification module 106 may identify downstream router 208(1) as the next hop of the multicast distribution tree of packet 500 by analyzing the forwarding information at that entry of forwarding table 120(1).

As a further example, identification module 106 may locate the forwarding information for packet 502 in the entry corresponding to tree label 622(1) within forwarding table 120(2) in FIG. 6. This forwarding information may indicate that upstream router 202(1) is to forward packet 502 to downstream router 208(2). Accordingly, identification module 106 may identify downstream router 208(2) as the next hop of the multicast distribution tree of packet 502 by analyzing the forwarding information at that entry of forwarding table 120(2).

Returning to FIG. 4, at step 460 one or more of the systems described herein may forward the packet to the downstream router of the multicast distribution tree on the way to the receiver. For example, forwarding module 108 may, as part of upstream router 202(1) in FIG. 3, forward the packet to downstream router 208(1) on the way to receiver 306(1). In this example, downstream router 208(1) may represent the next hop of the multicast distribution tree being traversed by the packet within the MPLS network.

Additionally or alternatively, forwarding module 108 may forward another instance of the packet to downstream router 208(2) on the way to receiver 306(2). In this example, downstream router 208(2) may represent the next hop of another multicast distribution tree being traversed by the other instance of the packet within the MPLS network.

The systems described herein may perform step 450 in a variety of different ways and/or contexts. In some examples, forwarding module 108 may direct upstream router 202(1) to send the packet to downstream router 208(1). In other examples, forwarding module 108 may direct upstream router 202(1) to send the other instance of the packet to downstream router 208(2).

The multicast distribution trees may be established, configured, and/or managed in a variety of different ways and/or contexts. In some examples, one or more of the systems described herein may select and/or assign the context label that identifies and/or specifies the controller corresponding to the forwarding table in question. For example, an assignment module 114 may, as part of upstream router 202(1) in FIG. 3, select and/or assign context label 124 to represent controller 206(1) in FIG. 3.

After assignment module 114 has selected and/or assigned context label 124 to controller 206(1), upstream router 202(1) may send context label 124 to controller 206(1). For example, signaling module 110 may, as part of upstream router 202(1), signal context label 124 to controller 206(1) via BGP. In turn, controller 206(1) may distribute context label 124 to router 304 because router 304 is directly upstream from upstream router 202(1).

In one example, controller 206(1) may send context label 124 to router 304 by way of BGP signaling, which facilitates control-plane programming. For example, signaling module 110 may, as part of controller 206(1), signal context label 124 to router 304 via BGP. By doing so, router 304 may know that context label 124 has been assigned by upstream router 202(1) to controller 206(1). Accordingly, upstream router 202(1) may perform label lookups for packets that include context label 124 in forwarding table 120(1) in FIG. 6.

Similarly, an assignment module 114 may, as part of downstream router 208(1) in FIG. 3, select and/or assign a context label to represent controller 206(1) in FIG. 3. After assignment module 114 has selected and/or assigned context label 124 to controller 206(1), downstream router 208(1) may send the context label to controller 206(1). For example, signaling module 110 may, as part of downstream router 208(1), signal that context label to controller 206(1) via BGP. In turn, controller 206(1) may distribute that context label to upstream router 202(1) because upstream router 202(1) is directly upstream from downstream router 208(1).

In one example, controller 206(1) may send that context label to upstream router 202(1) by way of BGP signaling, which facilitates control-plane programming. For example, signaling module 110 may, as part of controller 206(1), signal that context label to upstream router 202(1) via BGP. By doing so, upstream router 202(1) may know that the context label in question has been assigned by downstream router 208(1) to controller 206(1). Accordingly, downstream router 208(1) may perform label lookups for packets that include that context label in the forwarding table that corresponds to that context label.

In some examples, controller 206(1) and/or controller 206(2) may be responsible for assigning tree labels to certain multicast distribution trees within the MPLS network. In one example, assignment module 114 may, as part of controller 206(1) in FIG. 3, assign tree labels 122(1)-(N) to various multicast distribution trees within the MPLS network. In this example, signaling module 110 may, as part of controller 206(1), send tree labels 122(1)-(N) to some or all of router 304, upstream routers 202(1) and 202(2), and/or downstream routers 208(1)-(4) in FIG. 3 via BGP. By doing so, signaling module 110 may enable the various routers to forward traffic that includes context label 124 and one of tree labels 122(1)-(N) to the appropriate downstream router on the way to the final destination.

Similarly, assignment module 114 may, as part of controller 206(2) in FIG. 3, assign tree labels 622(1)-(N) to various multicast distribution trees within the MPLS network. In this example, signaling module 110 may, as part of controller 206(2), send tree labels 622(1)-(N) to some or all of router 304, upstream routers 202(1) and 202(2), and/or downstream routers 208(1)-(4) in FIG. 3 via BGP. By doing so, signaling module 110 may enable the various routers to forward traffic that includes the context label corresponding to controller 206(2) and one of tree labels 622(1)-(N) to the appropriate downstream router on the way to the final destination.

In some examples, controller 206(1) and/or controller 206(2) may send context labels and tree labels together. For example, upon receiving context label 124 from upstream router 202(1), controller 206(1) may assign tree label 122(1) to the multicast distribution tree that includes router 304, upstream router 202(1), and downstream router 208(1). Controller 206(1) may then send context label 124 and tree label 122(1) together to router 304 via BGP signaling. Additionally or alternatively, upon receiving the context label assigned by downstream router 208(1), controller 206(1) may send the context label assigned by downstream router 208(1) and tree label 122(1) together to upstream router 202(1) via BGP signaling.

In some examples, controller 206(1) may signal the same tree label for the same multicast distribution tree to each of the routers included in that multicast distribution tree. In other examples, controller 206(1) may assign a different tree label to the same multicast distribution tree for each of the routers included in that multicast distribution tree. For example, controller 206(1) may assign tree label 122(1) to a certain multicast distribution tree in connection with context label 124. In this example, controller 206(1) may send context label 124 and tree label 122(1) together to router 304 via BGP signaling. However, in this example, controller 206(1) may assign another tree label to that same multicast distribution tree in connection with the context label assigned by downstream router 208(1) to controller 206(1). Controller 206(1) may send the context label assigned by downstream router 208(1) and this other tree label together to router 304 via BGP signaling.

In some examples, the various routers included in the multicast distribution trees may each create a forwarding table that is specific to controller 206(1). In such examples, this forwarding table may include tree labels 122(1)-(N) because these tree labels were allocated and/or assigned by controller 206(1).

As a specific example, maintenance module 112 may, as part of upstream router 202(1), create forwarding table 120(1) that is specific to controller 206(1). Since, in this example, forwarding table 120(1) is specific to controller 206(1), maintenance module 112 may populate forwarding table 120(1) with tree labels 122(1)-(N), which were allocated and/or assigned by controller 206(1).

As another example, maintenance module 112 may, as part of upstream router 202(1), create forwarding table 120(2) that is specific to controller 206(2). Since, in this example, forwarding table 120(2) is specific to controller 206(2), maintenance module 112 may populate forwarding table 120(2) with tree labels 622(1)-(N), which were allocated and/or assigned by controller 206(2).

Figure 7:
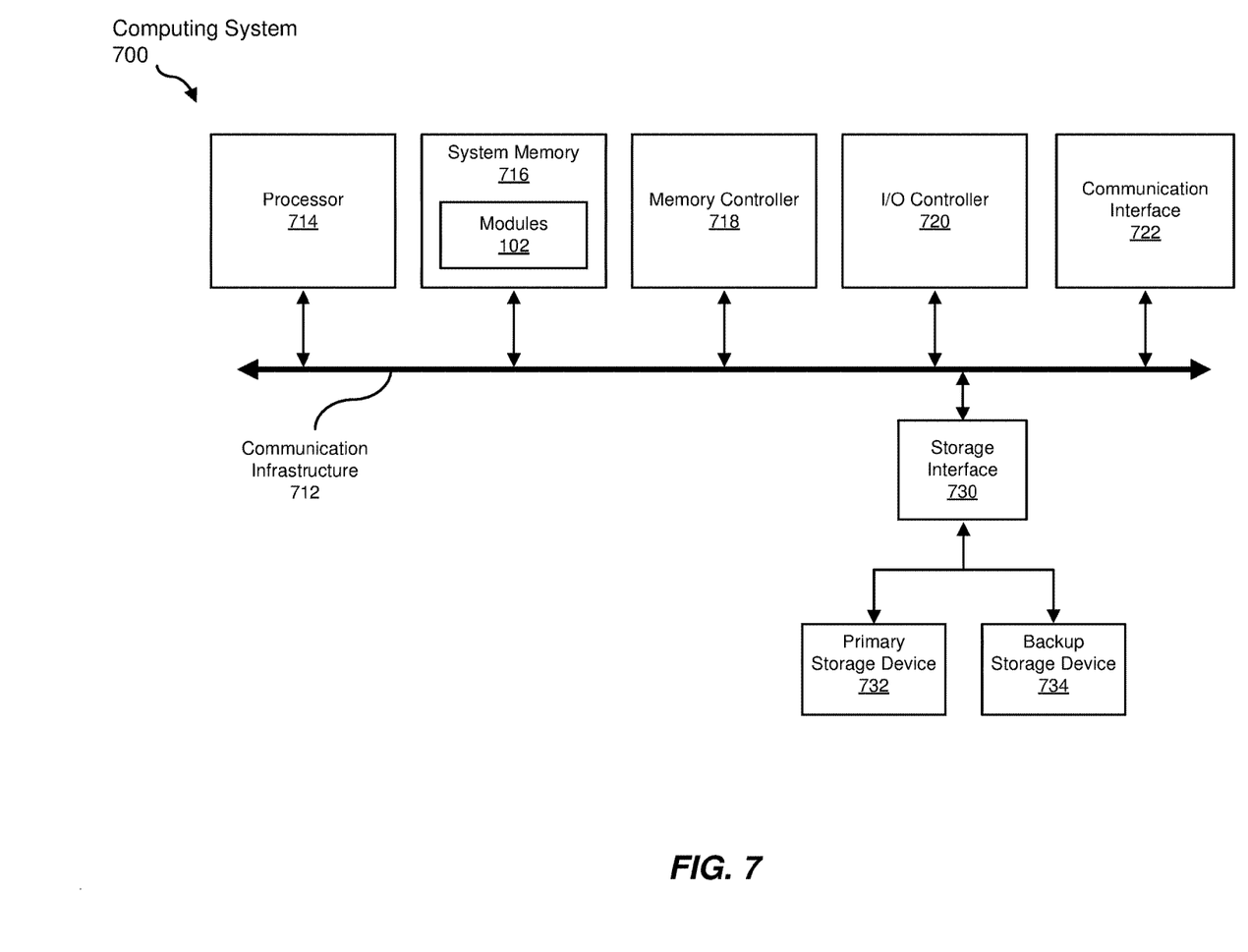
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All ora portion of computing system 700 may also perform and/or be a means for performing and/or implementing any other steps, methods, or processes described and/or illustrated herein. In one example, computing system 700 may include and/or store all or a portion of modules 102 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
receiving, at an upstream router of a multicast distribution tree, a packet that is destined for a receiver within a MultiProtocol Label Switching (MPLS) network that comprises a plurality of controllers responsible for assigning tree labels to multicast distribution trees;
identifying within the packet:
   a context label that specifies a controller included in the plurality of controllers; and
   a tree label that:
      specifies the multicast distribution tree; and
      is assigned by the controller specified in the context label;
identifying, at the upstream router, a plurality of forwarding tables that each correspond to one of the plurality of controllers;
identifying, within the plurality of forwarding tables at the upstream router, a forwarding table that corresponds to the controller specified in the context label identified within the packet;
searching the forwarding table that corresponds to the controller for the tree label that specifies the multicast distribution tree;
identifying, based at least in part on the search of the forwarding table, a downstream router of the multicast distribution tree that is to receive the packet on the way to the receiver within the MPLS network; and
forwarding the packet to the downstream router of the multicast distribution tree on the way to the receiver.

2. The method of claim 1, further comprising:
receiving, at the controller, the context label from the upstream router;
assigning, by the controller, the tree label to the multicast distribution tree;
sending, from the controller, the context label and the tree label to a further upstream router to enable the further upstream router to forward traffic that includes the context label and the tree label to the upstream router; and
sending, from the controller, the tree label to the upstream router to enable the upstream router to forward the traffic to the downstream router.

3. The method of claim 2, wherein:
receiving the context label from the downstream router comprises receiving the context label from the downstream router by way of Border Gateway Protocol (BGP) signaling;
sending the context label and the tree label to the upstream router comprises sending the context label and the tree label to the upstream router by way of BGP signaling; and
sending the tree label to the downstream router comprises sending the tree label to the downstream router by way of BGP signaling.

4. The method of claim 2, further comprising:
receiving, at the controller, another context label from the downstream router;
sending, from the controller, the another context label and the tree label to the upstream router to enable the upstream router to forward traffic that includes the another context label and the tree label to the downstream router; and
sending, from the controller, the tree label to the downstream router to enable the downstream router to forward the traffic that includes the another context label and the tree label toward the receiver.

5. The method of claim 1, further comprising:
selecting, by the upstream router, the context label that specifies the controller; and
assigning, by the upstream router, the context label to the controller.

6. The method of claim 1, further comprising signaling the multicast distribution tree to the upstream router and the downstream router by way of BGP.

7. The method of claim 1, further comprising:
creating, by the upstream router, the forwarding table such that the forwarding table:
   is specific to the controller; and
   includes only labels assigned by the controller; and
populating, by the upstream router, the forwarding table with the tree label.

8. The method of claim 1, further comprising maintaining, at the upstream router, at least one additional forwarding table that:
is specific to an additional device that is different from the controller; and
includes only labels assigned by the additional device.

9. The method of claim 8, wherein the additional device comprises at least one of:
an additional controller included in the plurality of controllers; and
the upstream router.

10. The method of claim 9, further comprising:
receiving, at the additional controller, an additional context label assigned to the additional controller from the upstream router;
assigning, by the additional controller, an additional tree label to the multicast distribution tree;
sending, from the additional controller, the additional context label and the additional tree label to a further upstream router to enable the further upstream router to forward traffic that includes the additional context label and the additional tree label to the upstream router; and
sending, from the additional controller, the additional tree label to the upstream router to enable the upstream router to forward the traffic to the downstream router.

11. A system comprising:
a receiving module, stored in memory at an upstream router of a multicast distribution tree, that receives a packet that is destined for a receiver within a Multi-Protocol Label Switching (MPLS) network that comprises a plurality of controllers responsible for assigning tree labels to multicast distribution trees;
an identification module, stored in memory at the upstream router, that:
   identifies within the packet:
      a context label that specifies a controller included in the plurality of controllers; and
      a tree label that:
         specifies the multicast distribution tree; and
         is assigned by the controller specified in the context label;
   identifies a plurality of forwarding tables that each correspond to one of the plurality of controllers;

identifies, within the plurality of forwarding tables, a forwarding table that corresponds to the controller specified in the context label identified within the packet;
searches the forwarding table that corresponds to the controller for the tree label that specifies the multicast distribution tree; and
identifies, based at least in part on the search of the forwarding table, a downstream router of the multicast distribution tree that is to receive the packet on the way to the receiver within the MPLS network;
a forwarding module, stored in memory at the upstream router, that forwards the packet to the downstream router of the multicast distribution tree on the way to the receiver; and
at least one physical processor configured to execute the receiving module, the identification module, and the forwarding module.

12. The system of claim 11, further comprising:
another receiving module, stored in memory at the controller, that receives the context label from the upstream router;
an assignment module, stored in memory at the controller, that assigns the tree label to the multicast distribution tree; and
a signaling module, stored in memory at the controller, that:
sends the context label and the tree label to a further upstream router to enable the further upstream router to forward traffic that includes the context label and the tree label to the upstream router; and
sends the tree label to the upstream router to enable the upstream router to forward the traffic to the downstream router.

13. The system of claim 12, wherein:
the another receiving module receives the context label from the upstream router by way of Border Gateway Protocol (BGP) signaling; and
the signaling module:
sends the context label and the tree label to the further upstream router by way of BGP signaling; and
sends the tree label to the upstream router by way of BGP signaling.

14. The system of claim 12, wherein:
the another receiving module receives another context label from the downstream router;
the signaling module:
sends the another context label and the tree label to the upstream router to enable the upstream router to forward traffic that includes the another context label and the tree label to the downstream router; and
sends the tree label to the downstream router to enable the downstream router to forward the traffic that includes the another context label and the tree label toward the receiver.

15. The system of claim 11, further comprising another assignment module, stored in memory at the upstream router, that:
selects the context label that specifies the controller; and
assigns the context label to the controller.

16. The system of claim 11, further comprising a maintenance module, stored in memory at the upstream router, that:
creates, by the upstream router, the forwarding table such that the forwarding table:
is specific to the controller; and
includes only labels assigned by the controller; and
populates, by the upstream router, the forwarding table with the tree label.

17. The system of claim 16, wherein the maintenance module maintains at least one additional forwarding table that:
is specific to an additional device that is different from the controller; and
includes only labels assigned by the additional device.

18. The system of claim 17, wherein the additional device comprises at least one of:
an additional controller included in the plurality of controllers; and
the upstream router.

19. The system of claim 18, further comprising:
another receiving module, stored in memory at the additional controller, that receives an additional context label assigned to the additional controller from the upstream router of an additional multicast distribution tree;
an assignment module, stored in memory at the additional controller, that assigns an additional tree label to the multicast distribution tree; and
a signaling module, stored in memory at the additional controller, that:
sends the additional context label and the additional tree label to a further upstream router to enable the further upstream router to forward traffic that includes the additional context label and the additional tree label to the upstream router; and
sends the additional tree label to the upstream router to enable the upstream router to forward the traffic to the downstream router.

20. An apparatus comprising:
at least one storage device that stores at least one forwarding table that includes a plurality of tree labels assigned to multicast distribution trees within a Multi-Protocol Label Switching (MPLS) network that comprises a plurality of controllers responsible for assigning tree labels to multicast distribution trees; and
at least one physical processing device that is communicatively coupled to the storage device at an upstream router of a multicast distribution tree, wherein the physical processing device:
receives a packet that is destined for a receiver within the MPLS network;
identifies within the packet:
a context label that specifies a controller included in the plurality of controllers; and
a tree label that:
specifies the multicast distribution tree; and
is assigned by the controller specified in the context label;
identifies a plurality of forwarding tables that each correspond to one of the plurality of controllers;
identifies, within the plurality of forwarding tables, a forwarding table that corresponds to the controller specified in the context label identified within the packet;
searches the forwarding table that corresponds to the controller for the tree label that specifies the multicast distribution tree;
identifies, based at least in part on the search of the forwarding table, a downstream router of the multicast distribution tree that is to receive the packet on the way to the receiver within the MPLS network; and
forwards the packet to the downstream router of the multicast distribution tree on the way to the receiver.

* * * * *